July 12, 1932.  S. J. BENNER  1,866,993
CONVEYER CHAIN
Filed Dec. 4, 1929
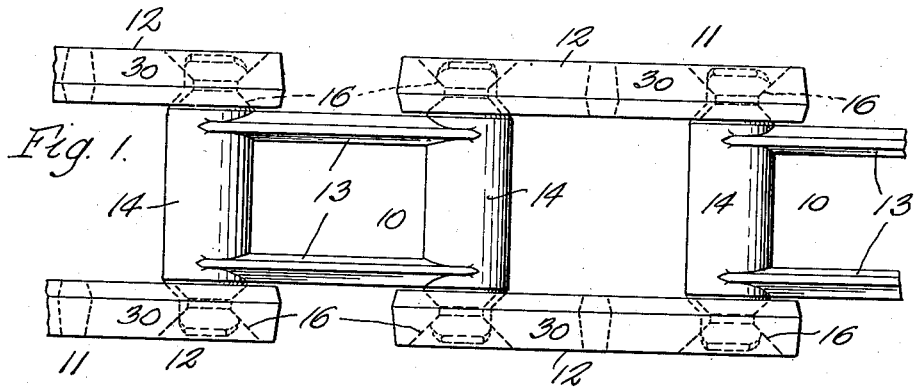
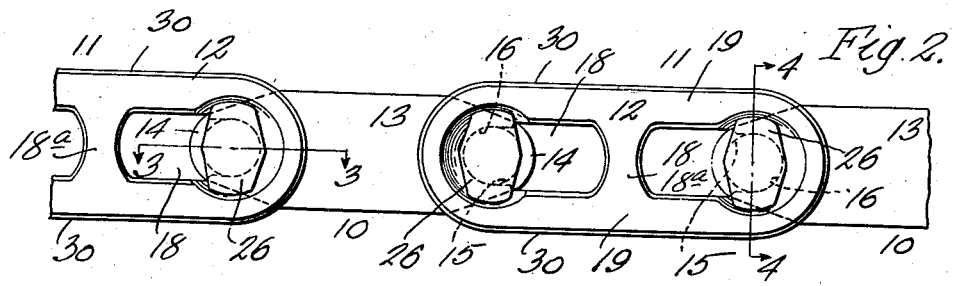
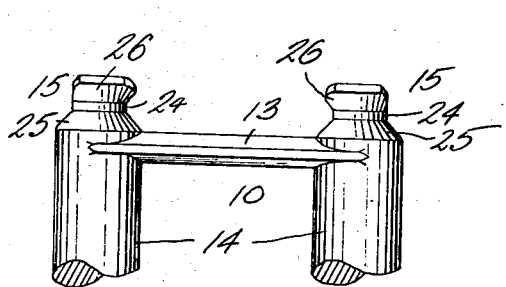
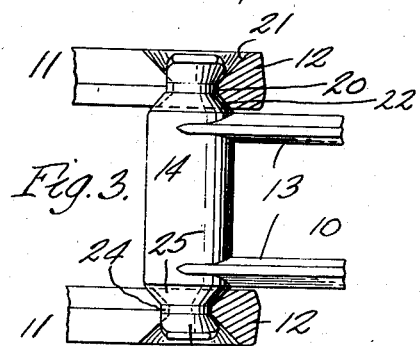
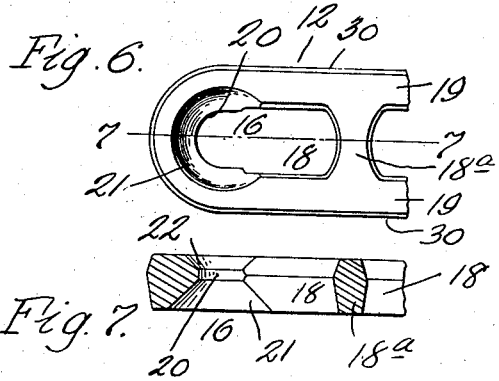
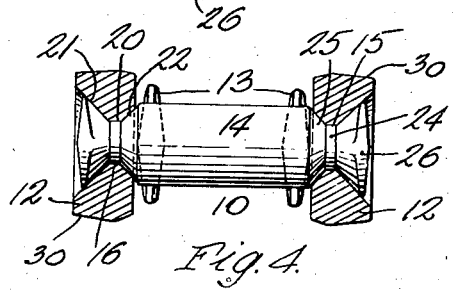
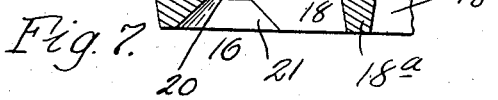
INVENTOR
Stanley J. Benner
by Parker & Crocknow
ATTORNEYS Patented July 12, 1932

1,866,993

UNITED STATES PATENT OFFICE

STANLEY J. BENNER, OF SPRINGFIELD, MASSACHUSETTS

CONVEYER CHAIN

Application filed December 4, 1929. Serial No. 411,518.

This invention relates to improvements in drive or conveyer chains of that kind in which two adjacent links may be disconnected after moving the links approximately into positions at right angles to each other.

Some objects of the present invention are to construct a drive or conveyer chain which is of relatively simple, strong and durable construction and capable of long wear; also to provide a chain of this sort provided with simple means, devoid of projections or parts entailing the use of extra metal, for preventing or limiting relative lengthwise movement or displacement between the links of the chain, when in use; and also to construct a chain having an improved link pivotal connection which permits the links or members of the chain to be readily attached or disconnected.

Another object is to construct a chain of this kind having alternating series of links in which the links of one series are formed with relatively wide, substantially flat bearing surfaces or shoes to take the wear resulting from engagement of the chain with sprocket wheels, guide rails or other parts, and which links, while giving long wear, also act to hold or maintain the other series of links out of contact with such parts.

Other objects are to provide a drive or conveyer chain having improved long wearing pivotal connections between the links thereof; also to construct said pivotal connections so that wobbling or tilting between the links of the chain and also between the chain and the guides, sprockets and other parts with which it engages in use is prevented; and also to construct a pivotal connection of this sort for the purpose last mentioned, which provides a three surface bearing and which is such that the interengagement and fit between the parts of the pivotal connection will be improved by wear incident to the use of the chain.

Other objects of the invention are to improve drive or conveyer chains in the other respects hereinafter set forth and claimed.

In the drawing:

Fig. 1 is a plan view of a portion of a drive or conveyer chain illustrating an embodiment of my invention;

Fig. 2 is a side elevation thereof;

Fig. 3 is a sectional plan view of a portion of the chain, approximately on the line 3—3, Fig. 2;

Fig. 4 is a transverse section thereof, approximately on the line 4—4, Fig. 2;

Fig. 5 is a plan view of a portion of one of the inner links of the chain;

Fig. 6 is a side elevation of a portion of one of the members forming an outer link of the chain; and Fig. 7 is a longitudinal section thereof, on line 7—7, Fig. 6.

In the illustrated embodiment of the invention, the drive or conveyer chain comprises a series of inner or connecting links 10 alternating with a series of outer links 11. The latter links each comprises a pair of elongated substantially flat side members 12 arranged on edge at the opposite outer sides of the inner connecting links 10.

The inner links 10 can be of any suitable construction. In the form shown, each link 10 comprises two elongated parallel spaced portions 13 extending lengthwise of the chain and integrally connected at their ends to transverse cylindrical portions 14. Pivot studs or journals 15 project laterally of the links from the ends of said transverse cylindrical portions 14.

The side members 12 of the double outer links 11 are provided preferably at both ends with arcuate bearing and pivot retaining seats 16 in which said pivot studs or journals 15 of the other links 10 rotatably engage, each pair of members 12 being thus connected to the two pivot studs or journals 15 at the adjacent ends of two of the inner links 10, as shown in Figs. 1 and 2.

As shown in the drawing, each of the outer link members 12 is of skeleton form having a lengthwise extending slot or aperture 18 which, as shown, may be intercepted by an intermediate bracing or cross piece 18a, connecting the opposite parallel side edges or portions 19. The bearing seats 16 are formed at the opposite outer ends of said slot 18 as shown in Figs. 4, 6 and 7. Each of these seats comprises a reduced intermediate portion 20 of arcuate or interrupted cylindrical form of a diameter not greater than the width of said slot and which connects with an interrupted, flaring tapered or conical outer portion or face 21 and a similar but smaller inner flaring, conical face 22. The ends of these several interrupted bearing faces 20, 21 and 22 terminate at or connect with the opposite parallel edges of the slot 18 of the member 12.

Each pivot stud or journal of an inner link 10 is formed to intergage and rotatably bear upon the intermediate face 20 and inner and outer faces 22 and 21 of a seat 16, being formed for this purpose with an intermediate cylindrical bearing portion 24, an inner tapered or conical portion 25 extending therefrom to and connecting with the adjacent end of the cross piece 14, and an outer head or retaining portion 26. This head or retaining portion 26 is also of tapered form but is preferably interrupted or cut away at opposite sides or in a direction perpendicular to the length of the chain, as shown in Fig. 2.

The width of the intermediate cylindrical bearing portion 24 of the stud or journal 15 is such that the studs will fit snugly and rotatably engage in the seats 16 with the inner conical portion 25 of each stud rotatably fitting or bearing on the corresponding inner conical face 22 of the seat, and with the outer interrupted conical face of the head 26 engaging and rotatably bearing on the outer conical seat portion 21 in a similar manner. In this way a relatively wide or extensive bearing contact is provided between the pivot studs 15 and the seats 16, and which forms a three face bearing maintaining the link members 12 in alinement, preventing lateral movement thereof, and also preventing wobbling or twisting of the links of the chain relatively to each other and to the sprockets, guides or other members over which the chain passes.

By making the outer head portion 26 of the pivots 15 of elongate or interrupted conical form as described, the inner and outer links can be readily connected toegther or detached by moving one link into substantially perpendicular relation to the other, whereupon the narrow portion of the head is brought lengthwise of the corresponding slot 18 and can be readily inserted into or removed therefrom.

As long as the links are maintained in operative position one to the other, however, there is no possibility of accidental disengagement of the inner and outer links and relative lengthwise movements of these links is prevented, since the distance between the opposite ends of the elongated head portions 26 is greater than the distance between the inner opposite ends of the conical seat portions 21 where these portions join or merge into the parallel side portions of the adjacent slot 18.

Thus any relative lengthwise movement of the pivots 15 into the slots 18, and consequently between the inner and outer links, is prevented by the engagement of the heads 26 in or with the seat portions 21, during the use of the chain. Moreover this result is obtained without the provision of projections or other parts which add weight and complicate the construction of the chain.

It will be seen upon reference to Fig. 2 that the vertical dimension or height of the inner links 10, is less than the corresponding dimensions of the outer link members 12. When therefore the chain is traveling along a guide or other supporting member, only the outer links 11 will engage with such members, the inner links being held out of contact therewith by said links 11. In order to further increase the life of the chain, the outer link members 12 have their side edge portions 19 formed with relatively wide and substantially flat parallel bearing faces 30, as shown in Figs. 1 and 4, and which, due to the considerable amount of material, of which they are formed, give relatively long wear. These wide faces also act in cooperation with the pivotal connections in maintaining the chain links against wobbling and twisting during their movement.

A drive or conveyer chain constructed as described can be made with a minimum number of operations and produced at a low cost since the links thereof can be formed of drop forgings. In making such drop forgings, it is of course, necessary to form the dies with sufficient draw or taper to enable them to be separated from the forgings. This procedure results in forming the bearing faces 30 of the link members 12 with a slight intermediate ridge or taper as indicated in Figs. 3 and 4. This, however, is of no particular disadvantage since this ridge soon wears away and leaves the desired flat bearing surfaces 30.

While the several novel features have been described and illustrated in connection with a chain having alternate single and double links, they may be advantageously employed in connection with chains of other construction.

I claim:

1. A chain comprising alternate inner and outer links, each of the latter comprising a pair of spaced members disposed at opposite sides of said inner links and each having a longitudinal slot formed with arcuate pivot bearing seats at the ends thereof, said pivot seats each comprising an interrupted cylindrical portion and opposite flaring, conical portions extending therefrom, and said inner links having pivots each formed with corresponding intermediate cylindrical and opposite flaring conical portions which rotatably fit in said seats to provide a three face contact, and one of said pivot portions acting in cooperation with the corresponding seat portion to prevent said pivot from moving out of said seat and entering the adjacent slot except when said links are moved into an inoperative relation, whereby relative lengthwise displacement between the chain links is prevented during normal use of the chain.

2. A chain link having a body, and a pivot stud extending laterally therefrom and which comprises an axial cylindrical intermediate portion, an inner flaring conical portion extending from one side thereof and connecting with a part on said body which extends lengthwise of said pivot axis directly away from said conical portion, and an outer flaring, interrupted conical enlargement extending from the opposite side thereof.

3. A chain comprising inner and outer links, each of the latter comprising a pair of spaced members disposed at opposite sides of said inner links and each having a longitudinal slot formed with arcuate pivot bearing seats at the ends thereof, each seat comprising an intermediate, interrupted, cylindrical and opposite outwardly flaring conical face portions extending to opposite perpendicular side faces on said links, and said inner links having pivots rotatably engaging in said seats and each of which is formed with a cylindrical intermediate portion and opposite, outwardly flaring conical portions corresponding to and engageable in said seats, and the conical portions of said pivots which are located at the inner sides of said outer links being extended from the intermediate portions of said pivots to or beyond said sides and connecting with portions of said inner links which extends perpendicular to said sides of said outer links, thereby providing a non-binding pivotal connection between said inner and outer links.

STANLEY J. BENNER.